United States Patent [19]

Pruckmayr et al.

[11] 4,202,964

[45] May 13, 1980

[54] METHOD FOR REDUCING OLIGOMERIC CYCLIC ETHER CONTENT OF A POLYMERIZATE

[75] Inventors: Gerfried Pruckmayr, Media, Pa.; Ivan M. Robinson, Wilmington, Del.

[73] Assignee: E. I. Du Pont de Nemours and Company, Wilmington, Del.

[21] Appl. No.: 962,311

[22] Filed: Nov. 27, 1978

Related U.S. Application Data

[63] Continuation-in-part of Ser. No. 887,332, Mar. 16, 1978, abandoned.

[51] Int. Cl.² .............................................. C08G 65/30
[52] U.S. Cl. .................................. 528/482; 528/417; 568/617
[58] Field of Search ................. 568/617; 528/417, 482

[56] References Cited

U.S. PATENT DOCUMENTS

| 3,359,332 | 12/1967 | Johnston | 260/615 B |
| 3,405,105 | 10/1968 | Blackwell | 260/79.3 |
| 3,925,484 | 12/1975 | Baker | 260/615 B |

OTHER PUBLICATIONS

Murbach et al., "Linear Polyurethanes from Polyalkylene Ether Glycols", Chem. Abstracts 55, 1057e (1961).
Rohm & Haas Co., Ion Exchange Department, Technical Bulletin-Amberlist 15.

*Primary Examiner*—Earl A. Nielsen

[57] ABSTRACT

The oligomeric cyclic ether content of a tetrahydrofuran/alkylene oxide polymerizate is significantly reduced by bringing the polymerizate into contact at elevated temperatures with an ion exchange resin bearing $-SO_3H$ groups.

8 Claims, No Drawings

METHOD FOR REDUCING OLIGOMERIC CYCLIC ETHER CONTENT OF A POLYMERIZATE

CROSS REFERENCE TO RELATED APPLICATION

This application is a continuation-in-part of application Ser. No. 887,332, filed Mar. 16, 1978, now abandoned.

DESCRIPTION

1. Technical Field

This invention relates to a method for reducing the oligomeric cyclic ether content of tetrahydrofuran (THF)/alkylene oxide polymerizates. It is more particularly directed to a method whereby the oligomeric cyclic ether content of a THF/alkylene oxide polymerizate can be significantly reduced by bringing the polymerizate into contact with a cationic ion exchange resin bearing —SO$_3$H groups.

2. Background Art

Copolymers of THF and alkylene oxides are known and have been used in the preparation of polyurethanes. Processes disclosed in the art for producing such copolyether glycols, such as that illustrated in British Pat. No. 854,958, also produce oligomeric cyclic ether byproducts, which may constitute as much as 7–15%, by weight, of the polymerizate.

The presence of these oligomeric cyclic ethers in the polymerizate can be undesirable for several reasons. First, the ethers are nonfunctional impurities and can represent an economic penalty to a purchaser of a polymerizate because up to 7–15% by weight, of the material purchased contains no reactive hydroxyl groups and may therefore be useless for the purposes intended. Secondly, when these polymerizates are used in preparing polyurethanes, the presence of the oligomeric cyclic ether byproducts tends to degrade the polyurethane's properties. This degradation manifests itself in much the same way as that encountered when an excess of plasticizer is used: the lower molecular weight oligomeric cyclic ethers vaporize slowly at elevated temperatures and are leached out by water and common organic liquids, which results in weight loss and undesirable dimensional changes in the polyurethane product.

The need therefore exists for a simple inexpensive method for significantly reducing the oligomeric cyclic ether content of THF/alkylene oxide polymerizates. This need is filled by the process of the invention, whereby the oligomeric cyclic ether content of such a polymerizate is significantly reduced by bringing it into contact with a cationic ion exchange resin bearing —SO$_3$H groups.

DISCLOSURE OF THE INVENTION

The THF/alkylene oxide polymerizates whose oligomeric cyclic ether content is reduced according to the process of the invention can be any of those produced by known methods of preparing THF/alkylene oxide copolymers. Illustrative of such methods are those shown in U.S. Pat. No. 3,425,999 to Axelrood and Lajiness and U.S. Pat. No. 4,071,492 to Bethea and Futamura. The disclosures of these documents are incorporated into this application by reference to show how such polymerizates are prepared.

"Alkylene oxide", as used herein, means a compound containing up to three carbon atoms in its alkylene oxide ring. The alkylene oxide can be unsubstituted or substituted with, for example, alkyl or aryl groups or halogen atoms. Illustrative of such compounds are ethylene oxide, 1,2-propylene oxide, 1,3-propylene oxide, 1,2-butylene oxide, 1,3-butylene oxide, 2,2-bis-chloromethyl-1,3-propylene oxide and epichlorohydrin. The polymerizates most commonly processed according to the invention are THF/ethylene oxide polymerizates and THF/1,2-propylene oxide polymerizates.

The polymerizates are used in the form from which most of the unreacted monomers have been removed, only insignificant amounts remaining. This is ordinarily done by distillation, using conventional techniques.

The oligomeric cyclic ether content of the crude polymerizates appears to be independent of the molecular weights and THF/alkylene oxide ratios of the copolymers contained in them, but does vary with their method of production. The polymerizates usually contain about 7–15%, by weight, of the ethers, and in some cases may contain as much as 15–18%.

As used herein, "oligomeric cyclic ether" means a compound having a calculated molecular weight of no more than about 500 and containing two or more of the following units linked together:

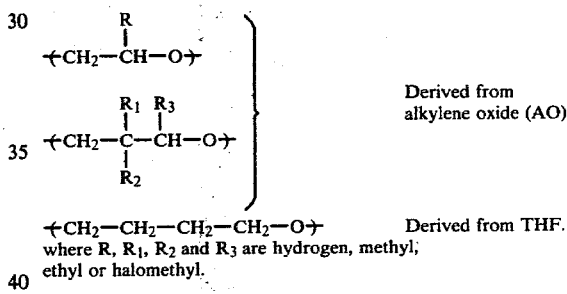

where R, R$_1$, R$_2$ and R$_3$ are hydrogen, methyl, ethyl or halomethyl.

Illustrative of such oligomeric cyclic ethers are those represented in the following table:

| Composition Ratio of AO Units to THF Units | |
|---|---|
| 2:1 | 1:4 |
| 1:2 | 3:3 |
| 3:1 | 5:2 |
| 2:2 | 2:4 |
| 4:1 | 4:3 |
| 1:3 | 6:2 |
| 3:2 | 3:4 |
| 5:1 | 5:3 |
| 2:3 | 2:5 |
| 4:2 | 4:4 |

The ion exchange resin used in the process of the invention can be any acidic cationic ion exchange resin bearing —SO$_3$H groups, insoluble in the reaction medium in which it is being used. "Insoluble" means that the amount of resin which dissolves in the medium under process conditions will give the copolymer product an acid number of no greater than 0.05 mg of KOH per gram.

For purposes of this invention, the nature of the "backbone" of the resin is unimportant. The most common commercially available resins of this type have backbones which are crosslinked copolymers of styrene and divinyl benzene, but resins having other backbones can be used. Preferred among the styrene/divinyl benzene resins, and preferred for use in practicing the invention, is one sold by the Rohm & Haas Company of Philadelphia, Pennsylvania, as Amberlyst® 15. This macroreticular resin has an initial hydrogen ion concentration of about 4.9 milliequivalents per gram (dry), an initial surface area of about 40-50 square meters per gram, an initial porosity of 0.3-0.35 milliliter of pore per milliliter of bead, and an initial average pore diameter of 200-600 Angstrom units. These values tend to change somewhat as the resin is used.

Illustrative of an ion exchange resin having a backbone other than a crosslinked copolymer of styrene and divinyl benzene is one sold by E. I. du Pont de Nemours and Company as Nafion® perfluorosulfonic acid resin. This resin is a copolymer of tetrafluoroethylene and a monomer represented by the structure.

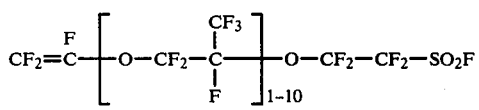

These copolymers are prepared in the sulfonyl fluoride form and are then hydrolyzed to the acid form, as described in U.S. Pat. No. 3,692,569.

The ion exchange resins having styrene/divinyl benzene copolymer backbones are preferably pretreated before use as follows:

1. The resin is placed in a column, backwashed with water, allowed to settle and then drained.
2. Two bed-volumes of 2N HCl are run through the resin over a twenty-minute period.
3. The acid is washed from the resin with five bed-volumes of water. At the end of the cycle, water is drained from the resin until a 2.5 cm head remains at the top level of the bed.
4. Two bed-volumes of 1.5N NaOH are run through the resin over a twenty-minute period.
5. The base is washed from the resin with five bed-volumes of deionized water. At the end of the cycle, water is drained from the resin until a 2.5 cm head remains at the top level of the bed.
6. Steps 1 and 2 are repeated.
7. The resin is washed with boiling water for one-half hour. Two bed-volumes of a 1:1 (volume) mixture of methanol and water are then run through the bed.
8. The resin is dried.

Once pretreated, and with periodic regeneration according to well-known methods, the resin can be used indefinitely, although long use may cause attrition of the resin or color formation and make its use impractical. The use of fresh catalyst is therefore preferred.

The process of the invention is begun by adding to a crude polymerizate 0.5-25%, preferably 3-7%, based on the weight of the polymerizate, of the ion exchange resin. The resulting reaction mass is continuously agitated and brought to a temperature of 60°-150° C., preferably 90°-110° C., and held there, preferably under a vacuum of 13.3 kilopascals or less, with agitation, until its oligomeric cyclic ether content has been significantly reduced. "Significantly reduced", in most cases, means that the oligomeric cyclic ether level has been brought down to about 1.5-3%, by weight of the polymerizate. It may be possible to reduce the oligomeric cyclic ether content even further by running the process for periods longer than those disclosed herein, or by raising the temperature at which it is run above the disclosed levels, but when the latter is done the polymerizate tends to discolor and undesirable side reactions tends to be induced. The use of vacuums of less than 13.3 kilopascals favors shorter processing times.

The time required to reach the 1.5-3% oligomeric cyclic ether level varies with the original cyclic ether content of the polymerizate and the temperature at which the process is conducted, but normally that level will be reached in 1-4 hours, the higher process temperatures favoring shorter times.

Oligomeric cyclic ether (OCE) content is determined by programmed gas chromatography, using a stainless steel column having a length of 3.049 meters (10 feet) and an outside diameter of 3.175 mm ($\frac{1}{8}$ inch), packed with 5% by weight of "OV-101", a methyl silicone oil sold by Supelco, Inc., supported on 100-120 U.S.S. mesh "Chromsorb G", sold by Hewlett-Packard, Inc. The column is an oven whose temperature is programmed to rise from 70°-300° C. at the rate of 30° C. per minute, with a 12 minute hold time at 300° C. before the cycle is repeated and with a glass liner for the injection port, which must be replaced frequently to prevent contamination of the port with nonvolatile fractions of sample. The instrument may be equipped with an integrator to determine the concentration of unknown in the sample. The determination is conducted under the following conditions:

| | |
|---|---|
| Injection port temperature | 280° C. |
| Thermal conductivity detector setting | 320° C. @ 150 milliamperes |
| Carrier gas @ gas flow | Helium @ 30 cubic centimeters per minute |
| Sample size | 10 microliters |
| Internal Standard | Dimethyl ether of triethylene glycol |

The procedue is standardized by first preparing three standard solutions containing, respectively, 2%, 5% and 10% by weight of purified OCE in tetrahydrofuran. A sample of each standard solution is then prepared by measuring into a sample bottle 1.00 gram of the standard solution, 0.10 gram of the dimethyl ether of triethylene glycol and 10 ml of reagent grade toluene, and then shaking the bottle. Duplicates of each sample are injected in turn into the chromatograph, which is then run under the previously mentioned conditions.

The response factor (RF) of the determination is then calculated for each sample according to the equation $$RF = \frac{(\%OCE \text{ in standard}) (\text{area } \% \text{ of internal standard}) \times (\text{weight of standard solution})}{(\text{area } \% \text{ of OCE}) (\text{weight of internal standard}) (100)}$$

Average response factor, $RF_1$, is found by averaging the six response factors thus calculated.

The determination of OCE content is carried out by first preparing a sample of THF/alkylene oxide polymerizate of unknown OCE content by measuring into a sample bottle 1.00 gram of solvent-free polymerizate, 0.10 gram of internal standard and 10 ml of reagent grade toluene, and then shaking the bottle. The sample is then injected into the chromatograph which is then run under the previously mentioned conditions. OCE content is calculated from the results according to the equation $$\text{Weight percent of OCE} = \frac{\text{area \% of OCE}}{\text{area \% of internal standard}} \times 10 \, RF_a$$

Purified OCE is obtained by first distilling a raw THF/alkylene oxide polymerizate (the alkylene oxide being the same as that in the copolymer of the unknown) in a 5.08 cm (2-inch) Pope wiped film molecular still, sold by Pope Scientific, Inc., Menomonee Falls, Wis. The distillation is carried out at 170°–190° C. and a pressure of less than about 26 Pa (0.2 mm of mercury), with an input rate of about 1 drop per second.

Two hundred parts by weight of the distillate are mixed with 60 parts by weight of 2,4-toluene diisocyanate and 3 drops of dibutyltin dulaurate and the mixture held at ambient temperature, with stirring, until the exothermic reaction subsides. The mixture is then held at 100° C. for two hours, with stirring, and its free isocyanate content determined by titration with di-n-butylamine, as described in Analytical Chemistry of the Polyurethanes, Volume XVI, Part III, D. J. David and R. B. Staley, Wiley-Interscience, 1969, pp. 357–359. Enough ethylene glycol to give an isocyanate/hydroxyl mole ratio of about 1/1 is added to the mixture, which is then brought to 100° C. and held there for two hours, with stirring, to complete conversion to a polyurethane.

The resulting mixture containing the inert OCE is then extracted with diethyl ether and the extract concentrated on a rotary evaporater at 100° C. and a pressure of about 1333 Pa (10 mm of mercury). The concentrate is then distilled in the Pope molecular still at 170°–190° C. and a pressure of less than about 26 Pa (0.2 mm of mercury) and an input rate of about 1 drop per second. The distillate is purified OCE.

When the process of the invention is run at the preferred temperatures, THF, water and various byproducts are given off from the reaction mass. These substances can be withdrawn from the reaction zone by sweeping it with an inert gas such as nitrogen or by running the process under vacuum. THF can be separated from the other byproducts by fractional distillation and can be recycled to the THF/alkylene oxide reaction if desired.

The process of the invention can be run batchwise or in a continuous fashion. When run continuously, the process is preferably run in stages to avoid the adverse effects of backmixing, as is well known in the art. In the continuous mode, the ion exchange resin is held in the reaction zone by the use of suitable filters or screens. When the process is run batchwise, the liquid product is removed from the reaction vessel, for example by decantation or through a screen, leaving the resin behind. The vessel can then be refilled and a new reaction begun, using the original resin.

The product of the process of the invention is a THF/alkylene oxide copolyether glycol polymerizate which, after final filtration, can be used directly for whatever purpose intended, without the need for further processing or purification.

EXAMPLE 1 (Best Mode)

(1) A stainless steel kettle equipped with a stirrer was charged with 2000 parts, by weight, of Amberlyst ® 15 resin, pretreated as described earlier, and 49,200 parts, by volume of a THF/EO polymerizate containing 7.5%, by weight, of oligomeric cyclic ethers, and from which most of the unreacted monomers had been removed. The mixture was continuously stirred and heated at 100° C. for 4 hours at a pressure of 10 kilopascals.

(2) The mixture in (1) was cooled to room temperature and the stirring stopped to allow the resin to settle. The vacuum was broken and the liquid product pumped out from the top of the kettle without disturbing the resin. About 43,500 parts, by volume of the THF/EO polymerizate were recovered. The polymerizate contained 2.4%, by weight, of oligomeric cyclic ethers, as determined by the gas chromatographic method described earlier, and had an acid number of less than 0.05 mg of KOH per gram.

The procedure described in (1) above will proceed more quickly if the vacuum is brought below 10 kilopascals.

EXAMPLE 2

One hundred parts, by weight, of the THF/EO polymerizate containing 9.8%, by weight of oligomeric cyclic ethers, and from which most of the unreacted monomers had been removed, was mixed with 5 parts by weight of granular Nafion ® resin, equivalent weight 1100, which had been hydrolyzed to the acid form and dried to constant weight. The mixture was heated to and held at 100° C., with constant stirring, under constant nitrogen flow at atmospheric pressure. The volatiles were collected in a cold trap.

After 2 hours, the Nafion ® was removed by filtration. The total concentration of oligomeric cyclic ethers in the filtrate was 1.5%, by weight, as determined by the gas chromatographic method described earlier. The filtrate had an acid number of less than 0.05 mg of KOH per gram.

INDUSTRIAL APPLICABILITY

The process of the invention can be used as a final step in the production of THF/alkylene oxide polymerizates, especially those based on ethylene oxide and propylene oxide. The polymerizates can then be used in the preparation of polyurethanes according to methods well known in the art.

We claim:

1. A method for reducing the oligomeric cyclic ether content of a tetrahydrofuran/alkylene oxide polymerizate, the method comprising bringing the polymerizate into contact, at a temperature of 60°–150° C., with 0.5–25%, by weight of the polymerizate, of a cationic ion exchange resin bearing —$SO_3H$ groups, insoluble in the reaction medium, for a time sufficient to significantly reduce the oligomeric cyclic ether content of the polymerizate.

2. The method of claim 1 conducted while byproducts are withdrawn from the reaction zone.

3. The method of claim 1 wherein the ion exchange resin is a macroreticular resin having a backbone which is crosslinked copolymer of styrene and divinyl benzene and an initial hydrogen ion concentration of about 4.9 milliequivalents per gram (dry), an initial surface area of about 40–50 square meters per gram, an initial porosity of 0.3–0.35 milliliter of pore per milliliter of bead, and an initial average pore diameter of 200–600 Angstrom units.

4. The method of claim 1 wherein the ion exchange resin is a copolymer of tetrafluoroethylene and a monomer represented by the structure

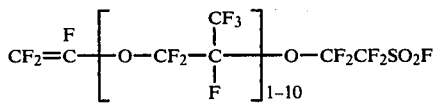

hydrolyzed to the acid form.

5. The method of claim 1 run at a temperature of 90°–110° C.

6. The method of claim 1 wherein the concentration of ion exchange resin is 3–7%, by weight of the polymerizate.

7. The method of claim 1 wherein the polymerizate is of a tetrahydrofuran/ethylene oxide copolymer.

8. The method of claim 1 wherein the polymerizate is of a tetrahydrofuran/ethylene oxide copolymer, the ion exchange resin is the resin of claim 3 at a concentration of 3–7%, by weight of the polymerizate, byproducts are withdrawn from the reaction zone and the method is run at a temperature of 90°–110° C.

* * * * *